Oct. 16, 1956  J. C. OWEN  2,767,366
ROTATING SYNCHRONOUS RECTIFIERS
Filed July 20, 1953  2 Sheets-Sheet 2

INVENTOR.
JOHN C. OWEN
BY Harry R. Lubcke
AGENT

2,767,366
ROTATING SYNCHRONOUS RECTIFIERS

John C. Owen, San Diego, Calif.

Application July 20, 1953, Serial No. 369,139

10 Claims. (Cl. 321—50)

My invention relates to rectifiers for converting alternating current into direct current by means of conducting rings synchronously rotated past brushes. My device performs in a manner superior to those of the prior art as regards short circuits and as to automatic maintenance of synchronization.

The prior art has been content with devices of this class in which a brief instant of shorting was tolerated at the beginning and end of each alternating half-cycle, or, at best, in which non-synchronous operation produced serious shorting, with loss of efficiency and short life of the machine. Also, the synchronous ring to brush setting, while capable of being manually adjusted to an average proper position, is known to vary with type of direct current load and with surges or other vagaries of the alternating current line. A device so constructed and connected as to be incapable of short circuit and capable of automatic adjustment to all circuit conditions met with in the field is indeed to be sought after.

Accordingly, an object of my invention is to provide a rotating synchronous rectifier incapable of mal-operation because of short circuits in the operating function.

Another object of my invention is to automatically maintain proper adjustment of the brushes to the synchronously rotating segments in a rectifier of this kind.

Another object of my invention is to provide a rectifying method and means which may be applied for half-wave, full-wave or polyphase rectification.

Another object of my invention is to provide a rectifier in which half-wave alternating cycles of opposite polarity are supplied to the rectifying portion from separate sources, as from separate transformer windings.

Another object of my invention is to provide a control circuit in a rectifier in addition to the rectifier circuit proper which is capable of supplying an electrical output when the synchronous ring vs. brush relation is not optimum for rectification.

Another object of my invention is to provide means to optimize the synchronous ring to brush spatial relation by electromechanical, or servo, means, utilizing the electrical output of the above-mentioned control circuit.

Another object of my invention is to provide a rectifier of large current-carrying capacity through a large brush to conductive ring area, made possible by my circuit of separate transformer windings for supplying alternating current of each polarity.

Another object of my invention is to provide a rotating synchronous rectifier of high efficiency and long life as a result of my novel commutation and adjusting schemes.

Other objects of my invention will be apparent to one skilled in the art upon reading the following detailed specification and examining the related drawings, in which:

Fig. 1B shows that portion of Fig. 1 altered by a quarter revolution of the rectifier.

The basic relation between a circumferentially wide brush and coacting synchronously rotating conductive ring has been described in my Patent No. 2,686,286 for Synchronous Ring Rectifier, dated August 10, 1954. My present disclosure is concerned with a novel arrangement and circuit connection for that or other type of synchronous rectifier as to connection to the alternating current power source and as to maintaining the relation of that connection instantaneously correct at the times of commutation.

Figure 1:
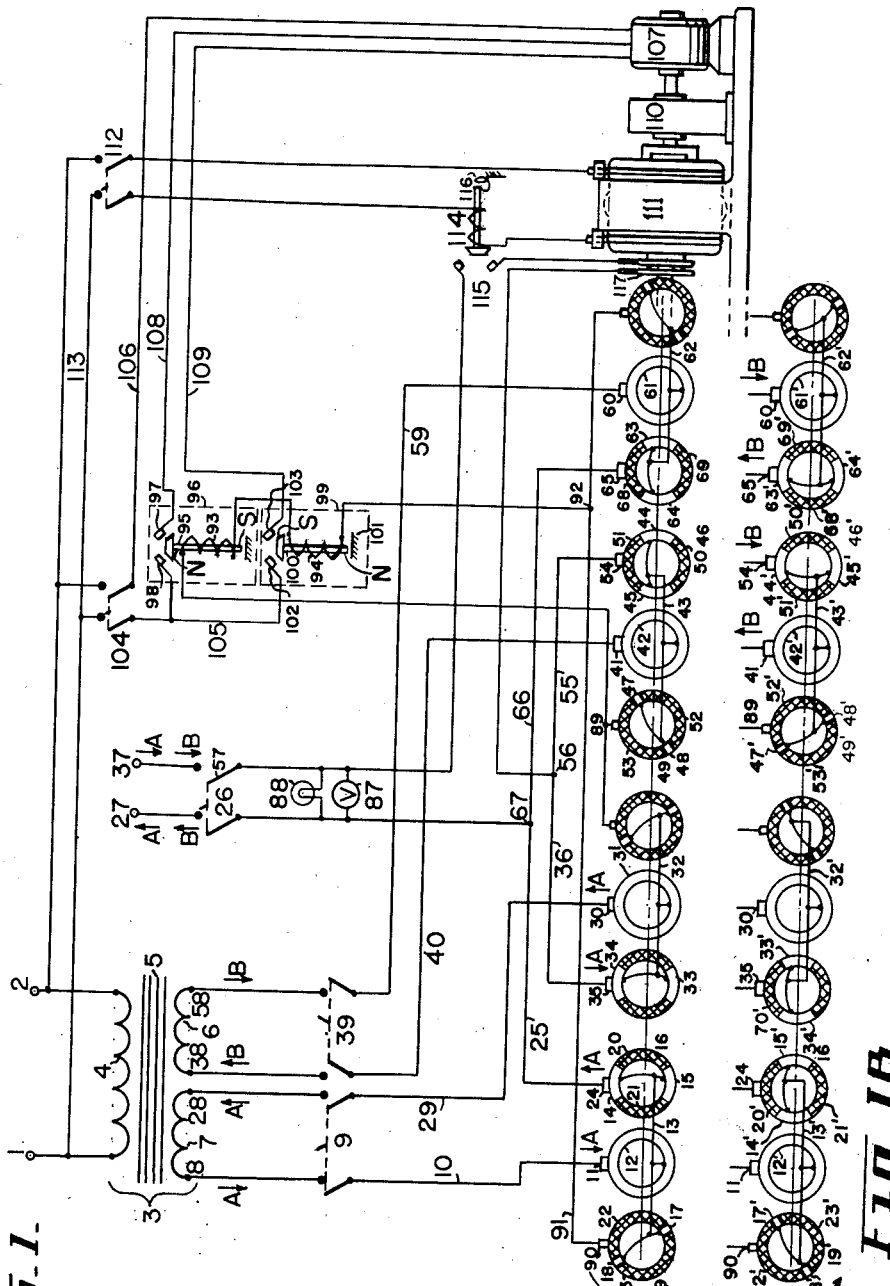
Fig. 1 shows a preferred arrangement for practicing my invention. This is a partially schematic diagram.

Fig. 1 shows a complete embodiment of my rectifier, mostly schematically. Terminals 1 and 2 represent connections to an incoming source of single phase alternating current power. In practicing my invention plural such sources may be utilized, or the equivalent thereof provided by employing transformer 3. This is comprised of primary 4, core 5 and secondaries 6 and 7. The turns ratio between the primary and each secondary may be either greater or less than one depending upon the output voltage required for particular kinds of loads, and the secondaries or primary may be provided with taps for adapting the rectifier for a number of uses.

In Fig. 1, the row of rings A represents the total number of rings in my device for single phase full wave rectification. Row B, Fig. 1B, represents the same rings at a different instant of time, when a quarter revolution of the rotating assembly has been accomplished. In row A, terminal 8 of secondary 7 is connected through switch 9 and wire 10 to brush 11, which bears upon slip ring 12. Switch 9 is shown open in accordance with drafting convention, but all such knife switches are closed in normal operation.

All of the rings shown at A are part of the same assembly and are rotated at synchronous speed. Within this assembly a wire 13 from fully conducting ring 12 connects to conducting segments 14 and 15 upon the adjacent segmented ring 16 and to the conducting segments 17 and 18 of the adjacent control ring 19. Segments 20, 21, 22 and 23 on these rings are insulated from all circuits and serve no conducting purpose. I prefer to make these insulated segments of the same or of an equivalent conductive material to that used for the conductive segments for reasons of uniform wear and to insulate these by known constructions utilizing washers, tubes and sheets of insulation; but these segments may be made of insulating material as shown diagrammatically in Fig. 1.

In the position shown, conducting segment 14 of the segmented ring is in contact with brush 24. Connection is consequently established through wire 25, through switch 26 to terminal 27. This is one of the direct current output terminals to which the useful load is connected. It will be noted that a conductive path has been traced from terminal 8 of the transformer to load terminal 27.

In a similar manner, the other terminal 28 of secondary 7 is connected through the other pole of double pole switch 9 and wire 29 to brush 30, slip ring 31, wire 32 and segments 33 and 34. At the same instant as before, brush 35 is in contact with conducting segment 34, thus connecting wire 36 to what has just been enumerated and through safety contacts 115, centrifugal switch 117 and the second pole of double pole switch 26 to terminal 37. This is the other direct current output terminal.

It will be seen that as long as brushes 24 and 35 are in contact with conducting segments 14 and 34 the circuit described will be maintained and current will flow from the alternating source of power to the direct current load.

Filter circuits comprised of condensers across and/or inductors in series with the direct current load, may, of course, be employed to reduce the ripple of the rectified alternating current.

I prefer to have two conducting and two insulated segments compose my segmented rings as shown, in which case one mechanical revolution accomplishes the rectification of two electrical cycles. In this instance the above-described connections will persist for a half-electrical cycle and for a quarter turn of the rotating assembly.

We now refer to secondary 6. In a similar manner to what has gone before, terminal 38 is connected through switch 39 and wire 40 to brush 41, which bears upon slip ring 42. A wire 43 from ring 42 connects to conducting segments 44 and 45 upon the adjacent segmented ring 46 and to the conducting segments 47 and 48 of the adjacent control ring 49. As before, segments 50, 51, 52 and 53 are insulated from all circuits.

In the position shown, insulated segment 51 of the segmented ring is in contact with brush 54. Connection is therefore not established from the circuit thus far described to wire 55, through junction 56 and via the safety switches and switch 26 to terminal 37 of the direct current output. This connection is not desired because the instantaneous polarity of the secondaries 6 and 7 are originally arranged to be in phase opposition, and were the connection made cancellation of the current flow would result.

Similarly, terminal 58 of secondary 6 is connected through the other pole of double pole switch 39 and wire 59 to brush 60, slip ring 61, wire 62 and segments 63 and 64. Again, insulated segment 68 of the segmented ring is in contact with brush 65. Connection is therefore not established from the circuit thus far described to wire 66, through junction 67 and switch 26 to terminal 27 of the direct current output. As before, this is not desired.

We next consider the connections a half electrical cycle later. By this time the rotating assembly has moved a quarter revolution from its previously described position. The new position is shown by another illustration of the rings in the line identified as B in Fig. 1B. Rotation has been counterclockwise.

In this position the same structure as A is shown directly below in B and a change in position of an element is identified by a primed reference numeral. Passing to the gist of the operation, it will be noted that brush 24, in contact with segmented ring 16, now bears upon insulated segment 20' rather than upon conducting segment 14 as before. In a similar manner, brush 35 now bears upon insulated segment 70' rather than upon conducting segment 34 as before. This is highly desired, since by now the instantaneous polarity of transformer secondary 7 is opposite to what it was when the rotating assembly was in position A and the polarity at terminals 27 and 37 must not be reversed if rectification is to be accomplished.

Similarly, whereas brushes 54 and 65 were upon insulated segments 51 and 68, these are now on conducting segments 44' and 63'. This results in current from secondary 6 flowing from terminal 58 through switch 39 and wire 59, through brush 60, slip ring 61', wire 62', segment 63', wire 66 and junction 67 to terminal 27. The return path through the load is from terminal 37, blade 57 of switch 26, safety contacts 115 and 117, junction 56, wire 55, brush 54, segment 44', wire 43', slip ring 42', brush 41, wire 40 to transformer secondary 6 terminal 38. Thus, the transformer secondary with the same instantaneous polarity as before is connected to the same direct current terminals, though the change in time has required that this be the opposite secondary to that previously connected.

The current flow with the rotating assembly at the instant of time corresponding to position A is designated in Fig. 1 and Fig. 1B with arrows and the letter A, whereas the same for instant and position B is designated by arrows B. Tracing these out on the diagram it will be noted that secondary 7 supplies the current flow through the left-hand pair of ring groups at time A and secondary 6 is open-circuited. At time B secondary 6 supplies the current flow through the right-hand pair of ring groups and secondary 7 is open-circuited.

In numerous rotating synchronous rectifiers of the prior art the direct current load circuit is instantaneously shorted through the brushes at the time of commutation, particularly if the brushes are incorrectly positioned circumferentially around the rotating member. The short occurs through the necessary connections in the rotating member or through the transformer winding connected to the pair of brushes involved in each instance.

In my invention this cannot occur. Reference to Fig. 1 shows, for instance, that brushes 11 and 24, in coaction with slip ring 12, wire 13 and conducting segments 14 and 15 comprise a structure that mal-adjustment of the brush 14 can only result in mis-phasing the alternating half-cycle of incoming energy. The succeeding half-cycle is handled by brush 41, ring 42, wire 43 and conducting segments 44 and 45. No part of this rotating assembly is connected to the previously mentioned assembly and the connection from brush 41 is to transformer secondary 6; separate from the one, 7, previously involved. Rings 19 and 49 are of no importance in this discussion, being for control purposes and operating into relatively high impedance circuits.

Figure 2:
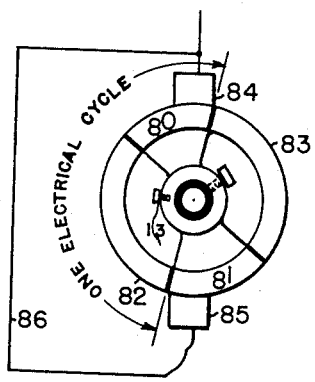
Fig. 2 shows a detail of the apparatus of Fig. 1.

In Fig. 2 there is shown a single segmented ring in end elevation. The conducting segments are 80 and 81, the insulated segments 82 and 83. Two brushes are shown, 84 and 85. All the elements save the last two correspond to the previously described segmented rings, such as that generally identified as 16. It is to be noted that my conducting segments are preferably circumferentially shorter than a quarter circumference by the circumferential width of the brushes and that the insulated segments are longer by a like amount. Stated in another way, the difference between insulated and conducting segments is twice the circumferential brush width. This allows a large brush area in contact with the ring and yet prevents contact with the conducting segment will the proper alternating half-cycle occurs.

The additional brush 85 is a modification applicable to all of the corresponding rings in Fig. 1 by means of which it is possible to double the current-carrying capability of my rectifier. Since the rotating assembly makes but a half revolution during a whole alternating cycle the same time vs. position relation exists 180 mechanical degrees from the previously described brush 84 as exists at that brush. A second brush 85 may be thus located and the two brushes connected together by a wire 86. Similarly, if desired, the synchronous motor utilized to rotate the assembly may be provided with another pair of poles, completing one revolution once every three cycles of alternating energy, the segmented rings comprised of three conducting and three insulated segments and three brushes spaced at 120 mechanical degrees may be used and connected together.

We consider now my control circuit. Under ideal and unchanging operating conditions a rotating synchronous rectifier remains in perfect synchronism. Under practical conditions second order effects occur. These have been manifest in rectifiers of the prior art by severe sparking and consequent burning away of the rectifying rings at the start and/or ends of the conducting segments. These effects may be caused by a change in mechanical load upon the synchronous motor subsequent to the time at which the rectifying brushes were manually adjusted and resulting in a change of mechanical to electrical phase angle. This is not loss of synchronism, merely an intra-cycle shift in the relation between the alternating current waveform and the corresponding instantaneous mechanical position of the rotating assembly.

Also, changes in the power factor of the incoming alternating current energy caused by reactive load changes upon that power line; i. e. induction motors being connected and disconnected from the line in relation to an in-phase load thereon such as incandescent lighting. Also, reactive transients of some duration on the direct current load circuit of the rectifier; i. e. starting a direct current motor under mechanical load. All these situations result in electrical-mechanical mis-phasing that can best be corrected automatically. The random nature and frequent occurrence of such disturbances is such that too much attention is required to manually maintain best operation of the rectifier.

Referring now to Fig. 1, I provide one control ring for each slip ring of the rotating assembly of my rectifier. It is not necessary to provide control rings for more than one phase in a polyphase embodiment of my rectifier, however. Ring 19 is illustrative of a control ring. Two relatively narrow conducting segments 17 and 18 are connected together and to a slip ring 12. Two insulated segments 22 and 23 are interposed between the conducting segments. The ring 19 is adjusted angularly with respect to brush 90 to make contact therewith during a brief interval centered about the instant when the main brush of the companion rectifying ring makes contact with a conducting segment; i. e., when brush 24 initiates contact with segment 14. At the instant mentioned the voltage of the alternating energy impressed upon slip ring 12 and the related conductive segments from the transformer 3 is zero. Were the circumferential width of brush 90 and segments 17 and 18 vanishingly small, no current would flow from ring 12 through brush 90 and to the control circuit to be described. If these have finite circumferential width a small alternating current of pulse waveform will flow, being of one polarity from the instant the brush 90 and segment 18 make contact until the point of no voltage of the alternating sine wave and of the opposite polarity thereafter until the brush and segment break contact. It is evident that were a direct current responsive relay be connected to this circuit no response would be had.

Consider now the action should the rotating assembly be out of phase with the alternating electrical energy. Assume that this is of sufficient amount to cause the brush 90 and segment 18 to make contact at the time of zero alternating voltage. In this instance the voltage passed on to the relay circuit will all be of one polarity, from the time contact is established until it is broken. Thus, a unidirectional pulse of current will flow and will actuate the relay. Actually, a few such pulses may be required to overcome the mechanical inertia of the relay and result in its operation since some mechanical inertia is relied upon to prevent operation on the alternating waveform previously described; that is, sufficient mechanical inertia to prevent the relay from following in alternating motion the alternating current in the windings thereof. No disadvantage accrues from this requirement since twelve such pulses occur in one-tenth of a second when the alternating frequency is sixty cycles per second. It will be understood that should the rotating assembly depart farther than previously described from electrical phase coincidence, the amplitude of the voltage and current pulses flowing in the control circuit will increase in correspondence. This is in accordance with the well-known increase of sine or equivalent wave functions from zero value to a maximum value ninety electrical degrees later. Obviously, the correction will be all the more prompt the greater is the error with my above-described arrangement.

Referring again to Fig. 1, the previously described control energy passes from brush 90 through wire 91 and junction terminal 92 to coils 93 and 94 of two relays. These are polarized relays, having a permanent magnet member 95 in relay 96 related to the direction of winding of coil 93 such that a positive D. C. voltage appearing upon wire 91 will cause member 95 to rise and close contacts 97 and 98. Conversely, the winding-polarity relation in relay 99 is opposite, so that the application of a positive potential as described and the resultant current flow will cause plunger 100 to be forced downward against stop 101 and contacts 102 and 103 to remain open. It is evident that a negative voltage on wire 91 will cause an opposite actuation; contacts 97—98 remaining open and contacts 102—103 closing.

A convenient source of electric power, such as the main sixty cycle input from terminals 1 and 2, either through a separate transformer (not shown) or not, is passed through a switch 104 provided for operative convenience in actuating the automatic synchronism aspect of my device and thence to the relay contacts. One wire, 105, is branched, one branch passing to each relay. The other wire, 106, passes directly to a reversible motor 107. Wire 108 connects relay contacts 97—98 to the motor, energization of which relay causes the motor shaft to revolve in one direction. Wire 109 connects relay contacts 102—103 to the motor, energization of which relay causes the motor shaft to revolve in the opposite direction.

Control motor 107 is mechanically connected to a gear box 110, which is in turn connected to the main synchronous driving motor 111 in such a manner to rotate the stator thereof. The gear box has a high reduction ratio. Consequently, several revolutions of the shaft of the control motor 107 will result in rotating the stator of motor 111 only a few degrees. Synchronous motor 111 is energized from the main alternating current circuit from terminals 1 and 2 via main operating switch 112 and pair of wires 113. Switch 112 is normally closed first and D. C. switch 26 closed last of the group of switches provided in placing the rectifier in operation.

The deailed functioning of my control circuit can now be summarized as follows. When the instantaneous position of my rotating assembly is out of synchronism with the alternating current supply a voltage and current of one polarity flows from the control rings through wire 91, et al., energizes one of the relays 96 or 99, causes control motor 107 to revolve in one direction and thereby readjust the position of the stator of synchronous motor 111 to correct the asynchronous condition. As to just what direction and polarity is observed in each of these instrumentalities may be determined by connecting the whole device together, operating it at a very light load and reduced voltage and observing the correction when the shaft of the control motor 107 is turned a few revolutions by hand. If the automatic circuit does not bring the stator of the synchronous motor back to proper sparkless operation, merely reverse the connections of wires 108 and 109 to the relay contacts 97 and 103. Once this circuit has been correctly completed it remains correct for synchronous operation and need not be altered.

In any synchronous rectifier it is important that the direct current load circuit not be completed unless the synchronous motor is operating normally. In order to provide automatic protection in this regard I provide solenoid switch 114 in the circuit 113 to the synchronous motor 111, having contacts 115 in the direct current load circuit adjacent to junction 56. Switch 114 may be adjusted by varying the tension of spring 116 such that unless the synchronous motor is drawing normal current the contacts 115 will not close. Switch 114 may be provided with a high impedance coil of many turns instead of that shown and connections across the pair of wires 113 utilized, being then effective upon normal voltage being impressed thereon. Similarly, a centrifugal switch 117 is shown as part of the rotating assembly, with series connection to the load circuit adjacent to junction 56. In this arrangement the load will not be applied until synchronous rotation is accomplished. Switch 117 has been shown schematically for simplicity. It is necessary that small slip rings and brushes be included in order to complete the circuit from rotating to stationary parts of the apparatus.

Figure 4:
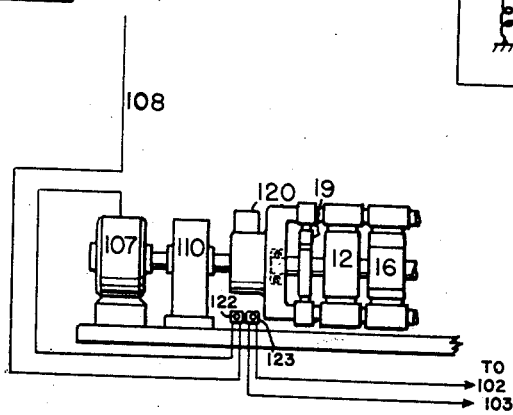
Fig. 4 shows an alternate mechanical arrangement of my device.

In Fig. 4 I show an alternate arrangement of adjusting the brush-segmented ring relation. The control circuit is the same as has been previously described. The difference resides in that the adjusting motion is imparted to the brush holders instead of to the stator of the synchronous motor. Control motor 107 and gear box 110 are the same as before. The reduced ratio output is now connected to arm 120, suitably journalled coaxially with the rotating assembly, represented in part in the figure by control ring 19, slip ring 12 and segment ring 16. Limit switches 122 and 123 are provided in wires 108 and 109 of the control motor circuit. These switches are normally closed and open, respectively, electrically, but upon the arm projection 120 mechanically actuating both of them at one extreme position circuit 108 is opened to prevent further energizing the control motor in the same direction and circuit 109 is closed across (in shunt) to relay contacts 102—103, thereby energizing the return circuit and initiating motion away from the extreme position. After this initiation the switches return to normal and the usual functioning of the relays 96 and 99 take over, "finding" a proper synchronous position for the brush assembly in relation to the circumferential identity of the rotating assembly. A duplicate set of limit switches is mounted directly behind the switches shown to limit the excursion of the arm 120 in the opposite direction. The circuit connections are just the reverse of those given.

Figure 3:
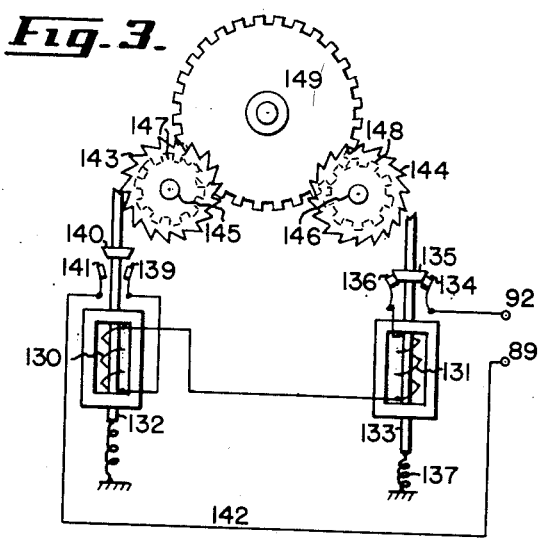
Fig. 3 shows an alternate arrangement of my device, particularly as to servo construction and operation.

In Fig. 3 is shown an alternate arrangement for automatically adjusting the brush-ring synchronous position in which the control circuit impulses directly actuate relay-like ratchet wheel devices for providing the necessary mechanical motion. Coils 130 and 131 are essentially the same as coils 93 and 94 of Fig. 1 and plungers 132 and 133 are are magnetized to give polarized operation as before. The control circuit junctions 89 and 92 are the same as those shown in Fig. 1.

It will be noted, however, that the connections of the contacts and coils are different than before. Assume that current enters the system at terminal 92. It passes through contacts 134, 135 and 136 because of the attraction of gravity holding these contacts together, preferably aided by a weak spring 137, and the current through coil 131. The turns of the coil and the magnetization of plunger 133 is such that the plunger is seated more securely between contacts 134, 135 and 136. The circuit is thus maintained to and through coil 130 and normally through second relay contacts 139, 140 and 141 and by return conductor 142 to the return terminal 89 of the control circuit. In Fig. 3 plunger 132 is shown in a fully actuated position, during which time contacts 139, 140 and 141 are momentarily separated as will be further explained.

Coil 130 is wound in the opposite direction to coil 131 and the magnetization of plunger 132 is the same as was that of 133. Consequently, the flow of current as postulated raises plunger 132, engaging a tooth on ratchet wheel 143 and moving the same clockwise. In the stationary contacts on these relay a certain spring tension toward the plunger is maintained. This causes the contacts 139 and 141, for instance, to continue contact with movable contact 140 for an appreciable part of the vertical travel of the plunger 132 so that the ratchet wheel 143 will be impacted. Subsequent thereto contact is broken and the plunger returns, reestablishing contact in readiness for the next current pulse from the control circuit.

It will be seen that successive pulses of unidirectional current in the control circuit, occasioned by mal-positioning of the brushes and segment rings with respect to the phase of the alternating current, will each actuate the proper relay and result in the advance of the associated ratchet wheel one tooth. The ratchet wheel 144 associated with plunger 133 is moved counterclockwise, whereas the previously described wheel is moved clockwise when actuated. Depending upon the polarity (direction of flow) of the control current pulses, either one relay or the other will be actuated, resulting in either clockwise rotation of one wheel or counterclockwise rotation of the other. Shafts 145 and 146 are mechanically coupled through pinions 147 and 148 to gear 149, which is then rotated in either one direction or the other according to the correction required. This gear is mechanically attached to either the stator of synchronous motor 111 in Fig. 1, or to the brush arm 120 in Fig. 4.

The above described arrangements correct the phase of the rotating assembly to exact synchronism. As such they are servomechanisms adapted to perform the required function.

A voltmeter 87 and lamp 88 are connected across the direct current load circuit. A maximum reading and brightness, respectively, on these elements indicates optimum synchronous adjustment.

The row of twelve rings shown at A in Fig. 1 constitutes a single-phase full-wave rectifier, complete with control circuit rings. If three-phase rectification is required two more sets of rectifying and slip rings are added, there being eight to the set. One group of control rings suffices to control the rotating assembly. The additional sets of rings are conveniently added to the single shaft, appropriately extended. Three pairs of transformer secondaries 6—7 are also provided and connected each pair to one set of rings, as before. All direct current load circuits are connected together. Should two phase current be required to be rectified, my rectifier consists of that shown and one extra set of rectifying and slip rings, along with one additional two-secondary transformer.

The use to which my rectifier is put is independent of my invention, but because of its relatively low impedance and high current-carrying capacity it is well suited for electroplating and industrial chemistry, for electrolysis, refining by electrical means in mining, for arc lamps, including those of high intensity and large current consumption as used in photographing and projecting motion pictures, and for operating direct current motors, operating the filaments of large radio vacuum tubes, charging storage batteries and like uses.

In these ways have I accomplished the several objects of my invention. Equivalent mechanical and electrical elements may be substituted for those I have shown so long as an equivalent overall function is accomplished. For instance, the brushes may bear upon the sides of the several rings rather than upon the periphery, the rectifier may be operated at other alternating current frequencies than the sixty cycles per second used for illustration, the worm and gear equivalent or chain of gears may constitute the gear box and numerous variations in details of the relays may be permitted, as well as in the protection circuitry and the limit switches.

Having thus fully described my invention, I claim:

1. A rotating synchronous rectifier comprising a conductive rotating assembly of plural conductive rings and segmented conductive rings, means to rotate said assembly in synchronism with alternating current to be rectified, a transformer connected to the source of said alternating current having plural separate and conductively unconnected windings, brushes contacting said conductive rings, connections from each of said separate windings to said brushes, one connection to one brush, connections from said conductive rings to alternate segments of said segmented conductive rings, further brushes contacting said segmented rings constituting the direct current output sources of the rectifier, said brushes and said segments so circumferentially related that connection is alternately established therebetween at all times to the output circuit of the rectifier but at no time between the separate windings of said transformer.

2. A rotating synchronous rectifier comprising a segmented conductive ring rotating assembly, means to rotate said assembly in synchronism with alternating current to be rectified, a source of three-phase alternating electrical energy, transformers connected thereto having two equivalent and conductively unconnected windings for each phase of said energy, brushes contacting said rotating assembly, at least one brush connecting a ring thereof to an end of one of said windings, said two equivalent windings being connected in opposite instantaneous phase for each phase of said three-phase alternating energy, said alternating energy thereby flowing from one said winding for one half cycle of one phase and from the equivalent winding for the succeeding half cycle, direct current output terminals for said rectifier, brushes contacting segmented rings of said assembly connected to said output terminals effecting alternate and mutually exclusive connection of said terminals to one of said equivalent windings for the duration of each half cycle of each of the three phases.

3. A rotating synchronous rectifier comprising a conductive rotating assembly of plural conductive rings and of plural segmented conductive rings having alternate insulated segments, means to rotate said assembly in synchronism with alternating current to be rectified, a transformer connected to a single phase of the source of said alternating current having plural separate and conductively unconnected windings, at least one brush contacting each of said conductive rings the same connected to one end of one said winding, connections from said conductive rings to alternate conductive segments of said segmented conductive rings, further brushes contacting said segmented rings constituting the direct current output sources of the rectifier, at least one brush to one ring, said brushes and said segments so circumferentially related that connection is alternately established therebetween in synchronism with the whole duration of the alternations of said alternating current source to the output circuit of the rectifier but at no time between the separate windings of said transformer.

4. A rotating synchronous rectifier comprising a conductive rotating assembly having plural conductive, segmented and control-segmented rings, means to rotate said assembly approximately in synchronism with alternating electrical energy to be rectified, plural separate conductively unconnected sources of said alternating energy, two for each phase to be rectified, brushes connecting said sources to said conductive rings, connections from said conductive rings to said segmented and to said control rings, brushes contacting said rings, said latter brushes and said segments in said segmented rings circumferentially related to effect alternate connection from said separate sources to the rectified energy circuit of said rectifier while maintaining separation between said sources, said latter brushes and the segments of said control rings spatially related to conduct substantially unidirectionally pulsed electrical energy for control from said sources when the rotating assembly is out of synchronism with said alternating energy, the polarity of said pulsed energy depending upon the direction of said rotating assembly from synchronism, and a polarity responsive electrokinematic chain coactively related to said assembly and actuated by said control energy to restore synchronism.

5. A rotating synchronous rectifier comprising a conductive rotating assembly having plural conductive, segmented and control-segmented rings, said segmented and said control-segmented rings having insulated segments circumferentially longer than the conductive segments composing said conductive assembly, means to rotate said assembly approximately in synchronism with alternating electrical energy to be rectified, plural separate conductively unconnected sources of said alternating energy, brushes connecting said sources to said conductive rings, connections from said conductive rings to said segmented and to said control rings within said rotating assembly, one conductive ring being connected only to one segmented and to one control ring, further brushes contacting said segmented and said control rings, said further brushes and said conductive segments on said segmented rings circumferentially related to effect alternate connection from said separate sources to the rectified energy circuit of said rectifier while maintaining separation between said sources, said further brushes and the conducting segments of said control rings oriented with respect to said further brushes and said segmented rings such that the former are in contact when the junction of the conducting and insulated segments of the latter are also in contact with the associated brush, said structure producing periodic unidirectional pulses of current when said rectifier is operating out of exact synchronism with said alternating energy, plural relays, one said relay actuated by unidirectional pulses of one polarity and another by pulses of opposite polarity, means to adjust the circumferential relation between said conductive assembly and said further brushes controlled by the actuation of said relays, said means sensed to correct a condition of asynchronism.

6. A rotating synchronous rectifier comprising a rotating assembly of slip rings, and segmented and control rings having circumferentially disposed alternate conducting and insulated segments, a connection from each slip ring to said conducting segments of one segmented and one control ring within said assembly, brushes bearing circumferentially upon said rings, the insulated segments of said segmented rings being longer than the conducting segments thereof by twice the circumferential length of said brushes, the insulated segments of said control rings being several times longer than the conducting segments thereof, the brushes of each slip ring connected to one terminal of alternating energy to be rectified, there being two such terminals to each instantaneous polarity of such energy and two separated groups of terminals of opposite instantaneous polarity to each phase of alternating energy to be rectified, the brushes of each segmented ring connected through said slip ring to one said terminal of said alternating energy and connected to one direct current terminal of said rectifier, means for rotating said assembly in approximate synchronism with said current to be rectified, said conducting segments of said control rings centered circumferentially with respect to the junction between said conducting and insulated segments of said segmented rings and oriented with respect to said means for rotating said rotating assembly such that the minimum value of said alternating electrical energy occurs when said conducting segments of said control rings are normally centered with respect to the brushes that bear thereon, each of said control ring brushes connected to two polarized electromechanical devices, one said device being adapted to initiate mechanical motion changing the circumferential relation of said brushes to said rotating assembly in one direction and the other said device being adapted to initiate mechanical motion changing the circumferential relation of said brushes to said rotating assembly in the other direction, the direction of said motion being such in relation to the alternating current energizing the conducting segments that the relation between said brushes and said rotating assembly is maintained so that transitions in the connections between said alternating current sources and said direct current terminals occur when said alternating current passes through zero value.

7. A rotating synchronous rectifier comprising a rotating assembly of slip rings, and segmented and control rings having circumferentially disposed altenate conducting and insulated segments, a connection from each slip ring to said conducting segments of one segmented and one control ring within said assembly, oppositely disposed brushes bearing circumferentially upon each of said rings, the brushes of each slip ring connetced to one end of a transformer winding energized with alternating electrical energy to be rectified, there being two separated windings for each phase of current to be rectified, the brushes of each segmented ring connected to one direct current terminal of said rectifier, means for rotating said assembly in approximate synchronism with said current to be rectified, said conducting segments of said control rings centered circumferentially with respect to the junction between said conducting and insulated segments of said segmented rings and with respect to said means for rotating said rotating assembly such that the minimum value of said alternating electrical energy occurs when said conducting segments of said control rings are centered with respect to the brushes that bear thereon, each of said control ring brushes connected to two relays, one said relay adapted to close contacts upon being energized predominantly with current having one polarity and the other said relay being adapted to close contacts upon being energized predominantly with current having the opposite polarity, a motor, means to energize said motor for rotation in one direction actuated by closing said one relay contacts and means to energize said motor for rotation in the other direction actuated by closing said other relay contacts, mechanical means to rotate said brushes circumferentially in relation to said rotating assembly, said means actuated by said motor in that direction that maintains said brushes and said conducting segments of said control rings centered when the minimum value of said alternating energy occurs.

8. A rotating synchronous rectifier according to claim 7 in which said motor energizing circuit contains limit switches for opening the branch of said circuit that is energized when said switches are operated and for closing the branch of said circuit that was not energized at that time, said switches mechanically actuated at extremes of travel of said mechanical means to rotate said brushes circumferentially.

9. A rotating synchronous rectifier comprising a rotating assembly of slip rings, and segmented and control rings having circumferentially disposed alternate conducting and insulated segments, a connection within said assembly from each slip ring to said conducting segments of one segmented and one control ring, brushes bearing circumferentially upon each of said rings, a brush of each slip ring connected to one end of a transformer winding energized with alternating electrical energy to be rectified, there being two such separate and conductively unconnected windings of opposite instantaneous polarity for each phase of current to be rectified, a brush of each segmented ring connected to one direct current terminal of said rectifier, means for rotating said assembly in approximate synchronism with said current to be rectified, said conducting segments of said control rings centered circumferentially with respect to the junction between said conducting and insulated segments of said segmented rings and with respect to said means for rotating said rotating assembly such that the minimum value of said alternating electrical energy occurs when said conducting segments of said control rings are centered with respect to the brushes that bear thereon, each of said control ring brushes connected to two solenoids, each solenoid provided with a permanently magnetized rod therein, one said solenoid connected to said brushes mechanically and said rod magnetized such that current from said control brushes in one direction causes motion of said rod and the other solenoid connected and rod magnetized such that current in the opposite direction causes motion of the other said rod, a ratchet-wheel positioned with respect to one said rod to accomplish clockwise rotation thereof upon movement of said rod and another ratchet-wheel positioned with respect to said other rod to accomplish counterclockwise rotation thereof, both said ratchet-wheels mechanically connected in relation to the positions of said brushes and said means for rotating said assembly to adjust said positions so that transitions in the connections between said transformer windings and said direct current terminals occur when said alternating current passes through zero value.

10. A rotating synchronous rectifier comprising a conductive rotating assembly, means to rotate said assembly in synchronism with alternating current to be rectified, plural separate conductively unconnected sources of alternating current, brushes contacting said rotating assembly and connected to said separate sources so that said sources are alternately connected to the direct current circuit of said rectifier but are not connected one to the other at any time, an electromechanical servomechanism, rings upon said rotating assembly having narrow conducting segments, brushes bearing thereupon connected to said servomechanism, said brushes positioned to be in contact with said conducting segments symmetrically related to the zero value of said alternating current when said rotating assembly is in exact synchronism and asymmetrically related to said zero value when said assembly is not in exact synchronism, a small symmetrical alternating current being thereby supplied to said servomechanism for the condition of synchronism and an asymmetrical pulsed current being supplied to said servomechanism for conditions of asynchronism, the polarity of said pulsed current being opposite for opposite directions of said rotating assembly away from synchronism.

References Cited in the file of this patent

UNITED STATES PATENTS

| 1,185,419 | Lyle | May 30, 1916 |
| 1,223,000 | Sandell | Apr. 17, 1917 |
| 1,286,795 | Sandell | Dec. 3, 1918 |
| 2,090,010 | Di Sabatino | Aug. 17, 1937 |
| 2,227,937 | Koppelmann | Jan. 7, 1941 |
| 2,557,739 | Goldstein et al. | June 19, 1951 |
| 2,557,740 | Goldstein et al. | June 19, 1951 |

FOREIGN PATENTS

| 64,187 | Netherlands | Oct. 15, 1949 |